United States Patent [19]

Young, II

[11] Patent Number: 4,960,183

[45] Date of Patent: Oct. 2, 1990

[54] SEISMIC SOURCE FIRING CONTROL SYSTEM

[75] Inventor: Dewey R. Young, II, Houston, Tex.

[73] Assignee: Exxon Production Research Company, Houston, Tex.

[21] Appl. No.: 766,230

[22] Filed: Aug. 16, 1985

[51] Int. Cl.$^5$ ............................................. H04R 1/02
[52] U.S. Cl. ..................................... 181/107; 367/144
[58] Field of Search ........................ 181/103, 106–108, 181/110–113, 116–120, 139; 367/15–20, 23, 106, 144, 145; 102/200, 217, 220, 311; 361/251, 156, 160, 205

[56] References Cited

U.S. PATENT DOCUMENTS

| | | | |
|---|---|---|---|
| 3,171,063 | 2/1965 | Hutchinson et al. | 317/80 |
| 3,588,039 | 6/1971 | Cheiminski et al. | 251/141 |
| 3,750,586 | 8/1973 | Swallow et al. | 102/220 X |
| 3,757,697 | 9/1973 | Phinney | 102/70.2 |
| 3,834,310 | 9/1974 | Ueda et al. | 361/251 X |
| 3,851,589 | 12/1974 | Meyer | 361/251 X |
| 4,034,827 | 7/1977 | Leerskov, Jr. et al. | 181/107 X |
| 4,047,591 | 9/1977 | Ward et al. | 181/119 |
| 4,104,970 | 8/1978 | Petersen et al. | 102/220 |
| 4,106,585 | 8/1978 | Huizer et al. | 181/107 |
| 4,157,069 | 6/1979 | Gustafason et al. | 102/200 |
| 4,193,472 | 3/1980 | Kirby | 181/118 |
| 4,210,222 | 7/1980 | Chelminski et al. | 181/107 |
| 4,240,518 | 12/1980 | Chelminski | 181/107 |
| 4,300,653 | 11/1981 | Cao et al. | 181/107 |
| 4,324,310 | 4/1982 | Wener et al. | 181/116 |
| 4,328,751 | 5/1982 | Oswald | 102/220 |
| 4,525,813 | 6/1985 | Burrage | 367/144 X |
| 4,599,712 | 7/1986 | Chelminski | 181/118 X |

OTHER PUBLICATIONS

U.S. Patent Application Ser. No. 708,310, filed Mar. 5, 1985.

*Primary Examiner*—Brian S. Steinberger
*Attorney, Agent, or Firm*—Richard F. Phillips

[57] ABSTRACT

A firing system for marine seismic sources 14 grouped and fired in subarrays 18. Each source 14 is provided with a firing circuit 30 including an energy storage device, such as a storage capacitor 32, adapted to pass firing current through the source actuator 24 in response to receiving a low power trigger signal from a source control system 28 located on the ship 16 from which the seismic survey is conducted. The firing circuit 30 corresponding to each source 14 is situated proximate the source 14. An umbilical 20 extends between the control system 28 and each subarray 18. The umbilical 20 includes a trigger signal conductor corresponding to each source, a charging conductor to which the storage capacitors of each firing circuit 30 are connected in parallel and a ground conductor.

18 Claims, 2 Drawing Sheets

SEISMIC SOURCE FIRING CONTROL SYSTEM

FIELD OF THE INVENTION

This invention relates generally to a method and apparatus for controlling seismic sources used in geophysical exploration. More specifically, the present invention relates to an apparatus for minimizing signal crossfeed from the firing command circuit to the firing detection circuit in a seismic air gun control system.

BACKGROUND OF THE INVENTION

Seismic exploration is one of the most powerful techniques for investigating the configuration of the rock strata underlying the earth's surface. The typical end product of a seismic survey is a map, termed a "seismic depth section," which can be used to determine the thickness and orientation of the various strata underlying that portion of the earth's surface from which the survey was conducted. By correlating the seismic depth section with other geologic information, such as data concerning surface outcroppings of various strata, wellbore corings, well logs, and previous seismic sections, surprisingly detailed information concerning the outermost several kilometers of the earth's crust can be developed. The predominant use of seismic exploration is in the search for subsurface structures favorable to the existence of oil and gas reservoirs.

Seismic exploration is typically performed by initiating a series of seismic impulses at the earth's surface and monitoring at a plurality of surface locations the resulting signals reflected and refracted from the underlying formations. This reflection and refraction occurs at surfaces where there is a change in the acoustic impedance of the earth, most commonly at the interface between different strata.

In conducting seismic exploration in offshore regions, swampland and other areas covered by water, seismic impulses are provided by a source suspended within the water. The most commonly used marine seismic sources are air guns. Air guns operate by abruptly introducing into the water at a desired moment a charge of highly compressed air. The compressed air expands very rapidly, accelerating the surrounding water to establish an acoustic pulse which travels radially outward from the source. The air guns and the hydrophones used for monitoring the reflection and refraction of the acoustic pulse from the subsurface strata are towed behind a survey vessel along the path of the desired seismic survey. A control and recording system on the survey vessel operates the air guns and records the data obtained by the hydrophones.

Most modern marine air gun systems employ an array of air guns which are fired simultaneously or nearly simultaneously to yield a composite acoustic pulse having characteristics superior to those obtained from a single air gun. Use of a properly selected and positioned array of air guns yields a higher pulse amplitude, a flater and broader pulse frequency band, minimizes bubble interference, and allows the generation of directional pulses for transferring a greater fraction of the acoustic energy into the subsurface strata lying along the path of the search.

One of the greatest problems encountered in the use of an array of several air guns is obtaining proper synchronization of the firing times of the individual air guns. It is essential that the acoustic pulse released by each air gun occur at the proper instant relative to the pulses generated by the other air guns. In most types of marine seismic surveying, source firing is controlled to yield in-phase addition of the pulse from each air gun. If destructive interference of the individual acoustic pulses occurs through improperly synchronized firing, the data obtained from the survey will be inferior. Obtaining proper synchronization of the onset of the individual acoustic pulses is complicated by the fact that for all air guns there is a time lag, termed the "firing delay," from the application of the firing command signal until the acoustic pulse is initiated in the water. Accordingly, it is necessary to apply the firing command signal sufficiently in advance to account for this delay. A further complication is presented by the fact that the magnitude of the time delay varies from gun to gun. Even for a particular gun, the time delay can vary with time.

To allow proper shot synchronization it is necessary to monitor the instant of firing for each shot of each gun. This is typically accomplished by monitoring the response of a piezoelectric pressure transducer mounted within the firing solenoid of the air gun. The shipboard control and recording system receives the firing detection signal from each air gun through an umbilical connecting the air guns to the ship and updates the delay time corresponding to each air gun. The timing of the firing command signals for the air guns within each array is adjusted to account for updates to the air gun delay times, thereby maintaining optimal synchronization.

In some marine seismic surveys, periodic difficulties occur in maintaining proper firing synchronization due to degradation of the firing detection signal. It has been discovered that this is the result of interference from voltage transients superimposed on the firing detection signal. These transients are largely due to the conductor transmitting the firing detection signal receiving cross talk from the relatively high current firing command signals applied to other conductors within the umbilical. It would be desirable to eliminate or minimize this cross talk. It would be further desirable to avoid the need for relatively large gauge conductors for transmitting the firing command signal from the seismic survey vessel to the air gun array.

SUMMARY OF THE INVENTION

The present invention is an improved firing control system for air guns and other acoustic sources used in seismic exploration. A preferred embodiment of this invention is used to control a marine acoustic source subarray comprising a plurality of individual air guns. Each air gun has a capacitive discharge circuit associated with it. The discharge circuit of each air gun within the subarray is controlled and powered through electrical conductors in an umbilical extending between the subarray and a seismic survey ship. The discharge circuit includes a storage capacitor which is charged by a constant voltage supply. A low voltage, low amperage trigger signal is used to close a discharge circuit path allowing the storage capacitor to discharge through the solenoid of the corresponding air gun, causing the air gun to fire.

The present invention substitutes a low power trigger signal for the relatively high power solenoid firing pulse of prior art air gun firing systems. This greatly diminishes the magnitude of the cross talk induced on the umbilical firing detection conductor. Additionally, the use of a lower power signal permits the gauge of the firing conductors in the umbilical to be significantly decreased. This results in a lighter umbilical and increases the maximum practical ship to subarray distance.

BRIEF DESCRIPTION OF THE DRAWINGS

For a better understanding of the present invention, reference may be had to the accompanying drawings, in which.

These drawings are not intended as a definition of the invention, but are provided solely for the purpose of illustrating certain preferred embodiments of the invention described below.

DESCRIPTION OF THE PREFERRED EMBODIMENTS

Figure 2:
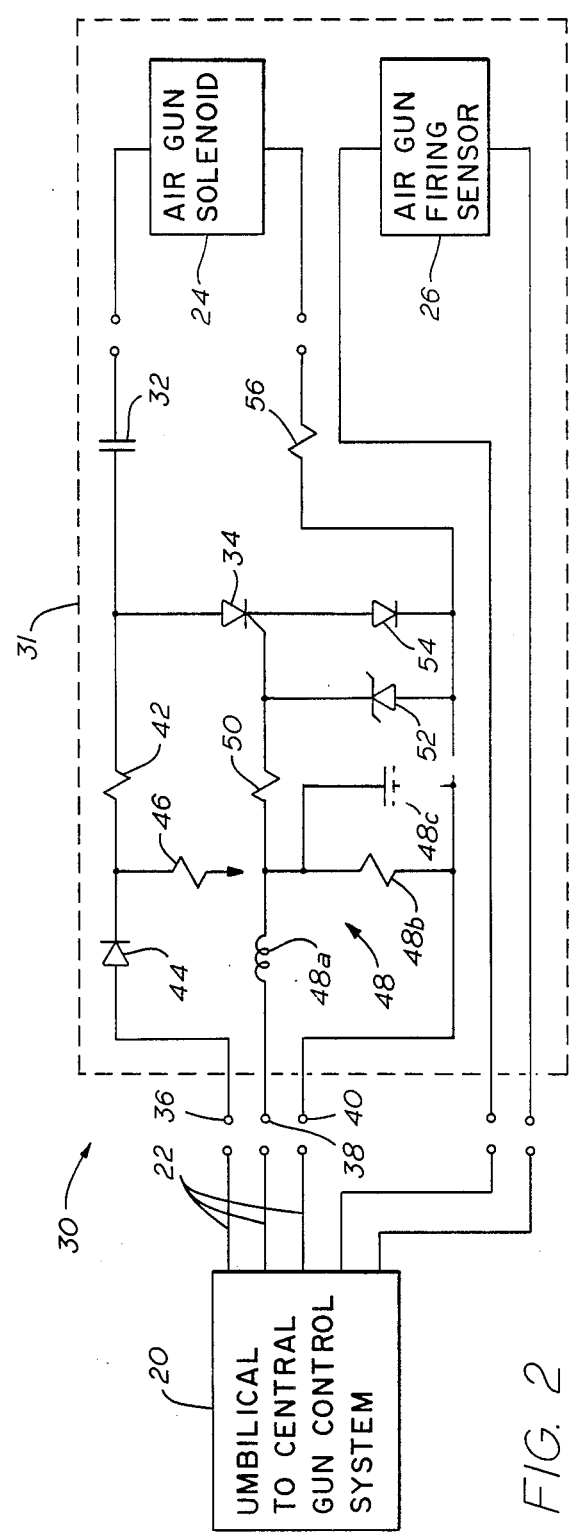
FIG. 2 is a circuit diagram of the capacitive discharge firing circuit of the present invention.

A preferred embodiment of the seismic source firing control system of the present invention is illustrated in FIG. 2. As will be set forth in great detail below, the preferred embodiment of the present invention is especially well suited for use in controlling the firing of air gun subarrays in marine seismic surveys. However, those skilled in the art will recognize that the present invention can be used with other types of distributed seismic sources used in seismic surveys conducted in marine or onshore regions. To the extent that the following description is specific to the control of air gun subarrays used in marine seismic surveys, this is by way of illustration rather than limitation.

Figure 1:
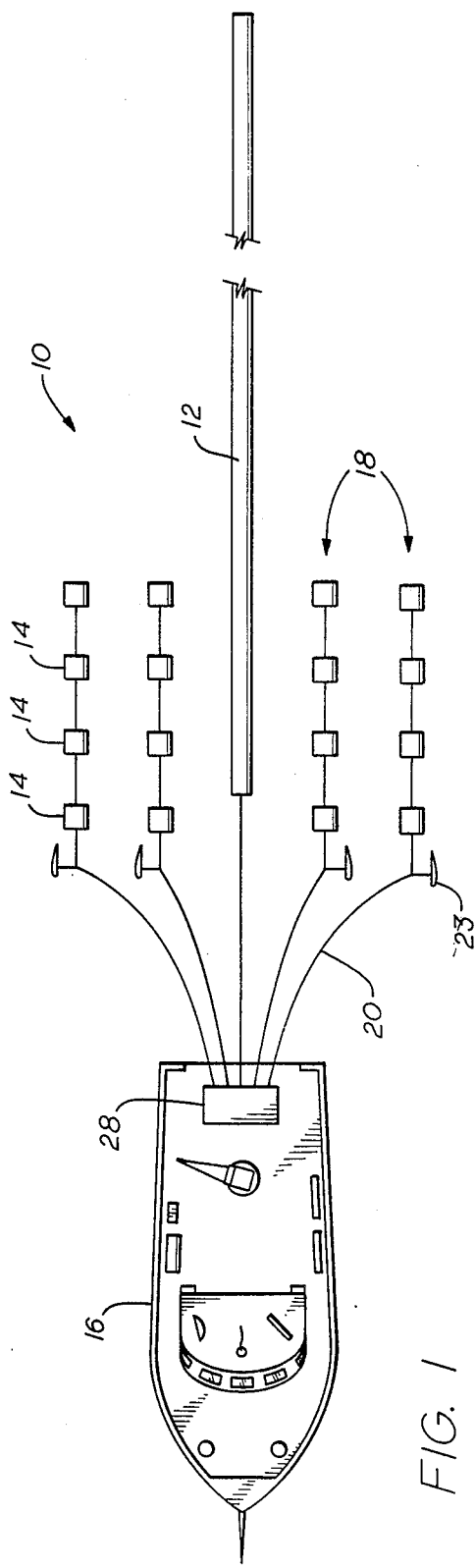
FIG. 1 is a diagrammatic illustration of a ship towing the sources and hydrophone streamer used in a typical marine seismic survey.

FIG. 1 illustrates a typical marine seismic exploration system 10 including a hydrophone streamer 12 and several seismic sources 14 towed by a ship 16. In the preferred embodiment, the seismic sources 14 are air guns positioned and fired in grouped subarrays 18 typically including from 4 to 20 air guns. A subarray of air guns fired in a controlled sequence permits the generation of a composite acoustic wave having amplitude, frequency and directional characteristics optimized for the water depths and geologic conditions anticipated for the seismic survey. Each subarray 18 is connected to the ship 16 by an umbilical 20. The umbilicals 20 each include an air supply line (not shown), a plurality of conductors 22 for firing and monitoring the air guns 14, and a cable or other tensile member (not shown) for supporting the load imposed by the subarray 18 as it is towed through the water. A typical umbilical is between 50 and 300 meters in length and includes from 16 to 80 conductors 22 for firing and monitoring the several air guns which it supports. Paravanes 23 are provided to maintain each subarray 18 a preselected lateral distance from the ship's track.

In the preferred embodiment, the air guns are PAR Air Guns manufactured by Bolt Technology Corporation of Norwalk, Conn. However, the present invention is equally applicable to the other types of air guns and can also be used in conjunction with other types of seismic sources, including gas guns, water guns, and sleeve exploders. Air guns include an electrically actuated solenoid 24 to control the release of high pressure air which serves to induce the acoustic pulse into the surrounding water. Air guns are typically provided with a firing sensor 26 which provides a low voltage firing detection signal at the instant the air gun 14 fires. This firing sensor 26 is most commonly a piezoelectric pressure transducer mounted adjacent the solenoid 24 and in pressure communication with the triggering piston chamber of the air gun 14. The piezoelectric pressure transducer is adapted to produce the firing detection signal in response to the transient pressure pulse which occurs in the triggering piston chamber at the instant the air gun firing chamber begins to vent to the surrounding water. Alternately, the firing sensor 26 can be hydrophone situated adjacent to the air gun 14 to detect the onset of the acoustic pulse resulting from air gun firing.

A central gun control system 28 is situated on the ship 16 for applying the firing command signal to each air gun 14 at the appropriate instant. The gun control system 28 receives the outputs from the firing sensor 26 associated with each air gun 14 and calculates firing delay for each air gun 14. Having calculated the firing delay for each air gun 14, the gun control system 28 establishes the instant at which it must apply the firing command signal to each air gun 14 within the subarray 18 to yield synchronized firing of all the air guns 14 within the subarray 18. Because the firing delay for an individual air gun can change with time, the gun control system 28 updates the firing delay for each air gun following every shot.

The firing command signal and firing detection signal are transmitted on conductors 22 extending through a common, lengthy umbilical 20. It is important to minimize the degree to which the relatively high current firing command signals induce voltage transients onto the firing detection conductors in the umbilical 20. In some instances these transients can be interpreted by the control system 28 as firing indications. This results in the control system 28 calculating erroneous firing delay values. Reduction of these transients is accomplished in the present invention by incorporating into the seismic exploration system 10 a capacitive discharge firing circuit 30 for each air gun 14, as illustrated in FIG. 2. The capacitive discharge firing circuit 30 is positioned proximate the air gun 14, preferably within the solenoid housing 31. This minimizes the length of the conductor carrying the firing pulse to the solenoid 24 and, hence, minimizes the degree to which transients from the firing pulse are induced onto conductors carrying the firing detection signals for each air gun.

The capacitive discharge firing circuit 30 includes a storage capacitor 32 which is trickle charged by a low amperage, 30 volt charging signal from the gun control system 28. The firing circuit 30 includes a silicon controlled rectifier 34 in a discharge circuit loop with the air gun solenoid 24, the storage capacitor 32 and a protection resistor 56. To activate the solenoid 24 and fire the air gun 14, a 100 mA, 8 V, 40 msec TTL pulse, the "trigger signal," is applied to the gate of the SCR 34. This closes the discharge circuit loop, allowing the storage capacitor 32 to discharge through the air gun solenoid 24, thereby firing the air gun 14. The storage capacitor 32 and other components of the discharge circuit loop are sized to provide sufficient energy to activate the solenoid 24. Typically, this requires a minimum energy of 5 watt-seconds. Upon firing, the trigger signal is removed. The inductive response of the solenoid 24 to the firing current reverse biases the SCR 34, shutting it off. This permits the storage capacitor 32 to commence charging for the next shot almost immediately following the firing of the air gun 14. The protection resistor 56 serves to limit the discharge rate of the storage capacitor 32 in the event the input and output to the solenoid 24 are shorted.

More specifically, the capacitive discharge firing circuit 30 includes a charging input 36, a trigger input 38, and a ground 40. The charging input 36 is maintained at 30 V. Connected in series with the charging input 36 and the storage capacitor 32 are a current limiting resistor 42 and a buffer diode 44. The current limiting resistor 42 should be sized to allow the storage capacitor 32 to rise to full charge in a period of time slightly less than the shortest anticipated firing cycle period for the air gun 14. The buffer diode 44 protects against discharge of the storage capacitor 32 should the charging input 36 be grounded. A bleed resistor 46 is provided between the positive terminal of the storage capacitor 32 and ground to permit gradual discharge of the storage capacitor 32 following removal of the 30 V signal at the charging input 36 upon conclusion of source firing.

The trigger input 38 is provided with an RCL filter 48 to substantially eliminate any cross talk greater than 10 kHz that may be induced in the corresponding umbilical trigger conductor from other conductors in the umbilical 20. A current limiting resistor 50 is placed in series in the gate input to the SCR 34. The voltage at the gate input is maintained at less than a preselected value, preferably about 6–7 volts, by a zener diode 52. To ensure proper operation of the SCR 34, it is important to avoid ground loops between the trigger input 38 and ground input 40. Accordingly, the ground for the trigger signal conductor of the central gun control system 28 on the ship 16 should be tied to the ground 40 of the firing circuit 30 through the umbilical ground.

The preferred values for the components of the firing circuit 30 illustrated in FIG. 2 are:

| Component | Reference Number | Value |
| --- | --- | --- |
| storage capacitor | 32 | 1000 μF, 200 V |
| SCR | 34 | 600 V, 2N4444 |
| current limiting resistor | 42 | $5.1 \times 10^3$ Ω, 5 watt |
| buffer diode | 44 | 3 amp, 200 V, IN5625 |
| bleed resistor | 46 | $3 \times 10^6$ Ω |
| filter inductor | 48a | 220 μH |
| filter resistor | 48b | $1 \times 10^3$ Ω, .5 watt |
| filter capacitor | 48c | .001 μF, 200 V |
| current limiting resistor | 50 | 500 Ω, .5 watt |
| zener diode | 52 | 6.8 V |
| diode | 54 | 3 amp, 200 V, 1N4999 |
| resistor | 56 | 5 Ω, 5 watt |

In existing air gun firing systems, the gun controller applies a firing voltage of from 150 to 300 volts DC to the umbilical firing conductor. The current carried by this conductor can peak as high as 20 amperes as the solenoid fires. In the present invention, the currents in the umbilical charging conductor and the umbilical trigger signal conductor peak at significantly lower values, typically less than about 100 mA, due to the lower applied voltages and the current limiting resistors 42, 50.

Figure 3:
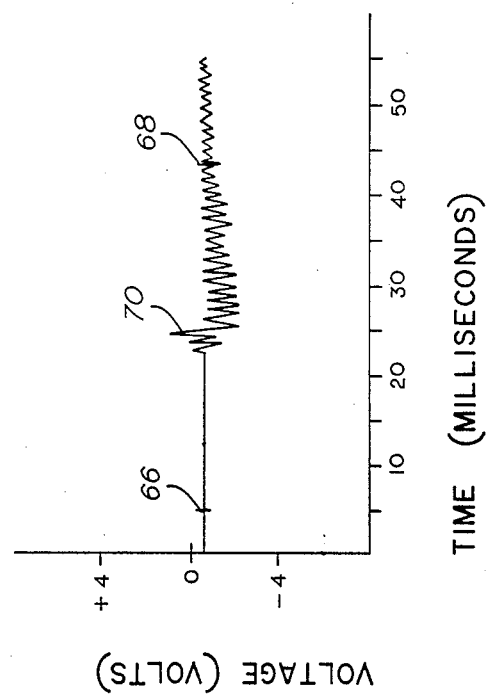
FIG. 3 is an oscillographic trace showing cross talk on the firing detection signal in a test of a prior art firing detection circuit.
Figure 4:
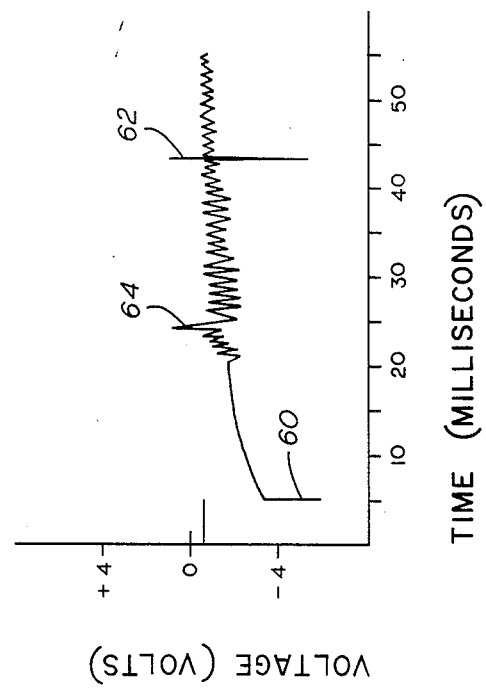
FIG. 4 is an oscillographic trace corresponding to the trace of FIG. 3, but showing the much lower level of cross talk superimposed on the firing detection signal in a test of the firing detection circuit of the present invention.

A test was conducted to compare the cross talk induced in a conductor carrying the firing detection signal in firing an air gun using the capacitive discharge circuit 30 of the present invention with the cross talk resulting from use of the high power signal of existing air gun firing systems. In this test a PAR 1500 ct air gun equipped with a Bolt time break solenoid valve, model SV-1200-511, was controlled through a 300 meter umbilical carrying twelve gauge control and monitoring conductors. FIGS. 3 and 4 represent the signal received by the gun controller from the firing detection conductor during the gun firing sequence using, respectively, the high power firing signal of the prior art and the capacitive discharge circuit 30 of the present invention. In the test represented by FIG. 3, a 150 volt DC signal was applied to the firing conductor to fire the solenoid. In the test represented by FIG. 4, the firing circuit 30 of the present invention was employed with the umbilical carrying a 30 volt DC charging signal and a 9 volt trigger signal.

The firing detection signal received by the gun controller is indicated by the reference number 64 in FIG. 3 and 70 in FIG. 4. Excepting only a negative DC shift in FIG. 3, discussed below, the two firing detection signals 64, 70 are substantially identical. Superimposed on the firing detecting signals 64, 70 are transients induced by the signal applied to fire the air gun. It will be noted that for both FIG. 3 and FIG. 4 there are two transients. The first occurs as a result of initiating the firing signal and the second as a result of terminating the firing signal. The firing transients 60, 62 induced on the firing detection conductor in the test represented by FIG. 3 were each approximately 5 V peak to peak, while the transients 66, 68 occurring with the capacitive discharge firing circuit 30 were each approximately 100 mV peak to peak. This corresponds to a 34dB reduction in cross talk on the firing detection output at the gun control system 28 through use of the capacitive discharge firing circuit 30 of the present invention. Of course, the relative reduction in the cross talk will vary with the solenoid firing energy required, the number of guns in the subarray, umbilical length and configuration, and several other factors.

In addition to greatly decreasing the cross talk picked up by the firing detection conductor, the present invention also permits a significant reduction in gauge of the umbilical firing conductors. Existing air gun firing conductors are typically eleven gauge copper wire. However, with the discharge firing circuit 30 of the present invention the firing conductors carry only a very low power trigger signal, permitting the use of twenty-two gauge trigger signal conductors. The charging inputs and ground for each air gun 14 within the subarray 18 can be series connected to a single charging conductor and a single ground conductor in the umbilical 20. These could be sixteen gauge conductors. The overall reduction in the diameter of the wires in the umbilical yields an umbilical which is lighter, less expensive, and smaller in diameter than umbilicals required in prior art air gun control systems. The decrease in umbilical weight and diameter facilitates wide line profiling by permitting a paravane of a given size to deflect the umbilical a greater distance from the ship's track.

An additional advantage of the present invention is that it permits deploying sources 14 at significantly greater distances from the central gun control system 28 than is practical with existing systems. The electrical resistance of eleven gauge firing conductors in a 300 meter umbilical is typically 24 to 30 ohms while the resistance of a typical air gun solenoid is six ohms; applying 300 V to the firing conductors yields only about 60 V across the solenoid. In systems in which the firing current must travel the full length of the umbilical, an umbilical length greater than about 300 meters causes difficulties in maintaining the minimum necessary firing voltage across the solenoid. Higher applied voltages and larger gauge conductors are problematic solutions in that the former results in difficulties in maintaining satisfactory insulation while the latter results in physical problems with umbilical size, weight and stiffness. These problems are avoided in the present invention by use of low voltage, low current trigger and charging signals which are relatively insensitive to the length of the umbilical.

Another advantage of using the discharge firing circuit 30 of the present invention is that it eliminates the negative DC shift of the firing detection signal inherent to Bolt-type firing sensors. It is believed that this negative DC shift is the result of the solenoid firing transient 60 charging the piezoelectric crystal of the firing sensor 26, which has inherent capacitance. This charge decays with a low RC time constant, as can be observed in FIG. 3. Use of the capacitive discharge firing circuit 30 of the present invention results in a greatly decreased solenoid firing transient 66 which causes substantially no DC shift, as shown in FIG. 4.

The preferred embodiment of the present invention and the preferred methods of using it have been detailed above. It should be understood that the foregoing description is illustrative only, and that other means and techniques can be employed without departing from the full scope of the invention as set forth in the appended claims.

WHAT IS CLAIMED IS:

1. A seismic survey system, comprising:
    a plurality of seismic sources, each adapted to fire in response to receiving an electrical firing command signal;
    a firing sensor positioned proximate each of said seismic sources, said firing sensor being adapted to generate an electrical firing detection signal in response to the corresponding seismic source being fired;
    a firing circuit associated with and proximate to each of said seismic sources, each firing circuit being adapted to provide a firing command signal to the corresponding seismic source in response to receiving an electrical trigger signal;
    a control unit adapted to receive said firing detection signals, to calculate an appropriate firing time for each of said seismic sources, and to apply an electrical trigger signal to each of said firing circuits to fire the corresponding seismic source at the appropriate instant, said control unit being positioned a spaced distance from said seismic sources; and,
    an umbilical extending from said control unit to said plurality of seismic sources and firing circuits, said umbilical being adapted to transmit trigger signals from said control unit to said firing circuits and to transmit firing detection signals from said firing sensors to said control unit.

2. The seismic survey system as set forth in claim 1, wherein each firing circuit is a discharge circuit, said discharge circuit including a storage capacitor adapted to discharge on receipt of said trigger signal.

3. The seismic survey system as set forth in claim 2, wherein each of said capacitive discharge circuits is provided with a charging input and said umbilical is provided with at least one conductor for trickle charging the storage capacitor of each capacitive discharge circuit.

4. The seismic survey system as set forth in claim 3, wherein said seismic sources are grouped in subarrays, the charging input for each of the discharge circuits associated with each subarray being connected in parallel to a single trickle charging conductor in said umbilical.

5. The seismic survey system as set forth in claim 1 wherein said plurality of seismic sources each are adapted to fire repeatedly over the course of a seismic survey, each firing being in response to receipt of an electrical firing command signal, and wherein each firing circuit includes a storage capacitor adapted to discharge to establish said firing command signal in response to receiving said trigger signal, and wherein each of said firing circuits is provided with a charging input and said umbilical is provided with at least one conductor for charging the storage capacitor of each firing circuit.

6. The seismic survey system as set forth in claim 5 wherein the charging inputs of at least some of said plurality of seismic sources are connected in parallel to a single capacitor charging conductor in said umbilical.

7. The seismic survey system as set forth in claim 5 wherein said seismic sources are air guns, each air gun including a firing solenoid electrically connected to said firing circuit so that discharge of said capacitor establishes a voltage across said solenoid, said umbilical including a plurality of trigger signal conductors, each corresponding to one of said air guns.

8. A marine seismic survey system, comprising:
    a ship;
    at least one subarray of seismic sources adapted to be towed behind said ship, each of said sources within said subarray being adapted to fire a plurality of times in the course of a seismic survey, each firing of each source being in response to said source receiving an electrical firing command signal;
    a capacitive discharge firing circuit associated with and adjacent to each of said sources, each of said firing circuits being provided with a storage capacitor, said firing circuits being adapted to discharge said storage capacitor through the corresponding seismic source in response to said firing circuit receiving an electrical trigger signal, the discharge of said storage capacitor establishing said electrical firing command signal;
    a control unit on said ship, said control unit being adapted to generate said trigger signals; and,
    an electrical umbilical extending between said control unit and said seismic source subarray, said umbilical including a plurality of trigger signal conductors each corresponding to one of said firing circuits, said umbilical also including a charging conductor to which the storage capacitor of each firing circuit is connected in parallel.

9. The seismic survey system of claim 8 wherein said seismic sources each include a firing solenoid adapted to receive the discharge of the corresponding storage capacitor, said solenoid serving to fire said seismic source in response to applying said firing command signal to said solenoid.

10. The seismic survey system of claim 9 wherein each firing circuit includes a SCR, said SCR, storage capacitor and firing solenoid forming a circuit loop, the gate input of said SCR receiving the signal from the corresponding one of said umbilical trigger signal conductors.

11. A marine seismic survey system, comprising:
a ship;
a plurality of marine seismic sources adapted to be towed by said ship, each source being adapted to fire in response to receiving an electrical firing command pulse;
at least one capacitive discharge firing circuit, said firing circuit including a storage capacitor adapted to discharge to provide said firing command pulse to a corresponding at least one of said seismic sources in response to said capacitive discharge firing circuit receiving an electrical trigger signal;
a firing sensor positioned proximate each of said seismic sources, said firing sensor being adapted to generate an electrical firing detection signal in response to the corresponding seismic source being fired;
a control unit adapted to apply an electrical trigger signal to said at least one firing circuit and to receive said firing detection signals, said control unit being positioned on said ship; and
an umbilical extending between said control unit and said at least one firing circuit, said umbilical being adapted to transmit trigger signals from said control unit to said at least one firing circuit and to transmit firing detection signals from said firing sensors to said control unit.

12. The marine seismic survey system of claim 11 wherein each of said seismic sources is provided with a capacitive discharge firing circuit, said umbilical being provided with a plurality of trigger signal conductors, each corresponding to one of said firing circuits.

13. The marine seismic survey system as set forth in claim 12, wherein said seismic sources each include a firing solenoid and are adapted to fire in response to the application of a preselected voltage across said firing solenoid, said storage capacitor and firing solenoid being in a circuit loop with means for closing the circuit loop in response to receipt of said electrical trigger signal.

14. The marine seismic survey system as set forth in claim 13, wherein said umbilical includes a charging conductor in electrical communication with at least one of said storage capacitors.

15. The marine seismic survey system as set forth in claim 14, wherein the storage capacitors of a plurality of said firing circuits are connected in parallel to a single charging conductor in said umbilical.

16. The marine seismic survey system as set forth in claim 13, wherein each firing circuit and the firing solenoid corresponding to said firing circuit are located in a common housing secured to the corresponding one of said sources.

17. The marine seismic survey system as set forth in claim 16, wherein said seismic sources are air guns.

18. The marine seismic survey system as set forth in claim 12, wherein said seismic sources are air guns.

* * * * *